United States Patent [19]
O'Brien

[11] Patent Number: 5,813,367
[45] Date of Patent: Sep. 29, 1998

[54] CHILD SAFETY HARNESS

[76] Inventor: Larry Dale O'Brien, #1210, 1175 Douglas Street, Victoria, B.C., Canada, V8W2E1

[21] Appl. No.: 593,428

[22] Filed: Jan. 29, 1996

[51] Int. Cl.$^6$ .................................................. A62B 35/00
[52] U.S. Cl. ........................ 119/770; 119/771; 119/857; 297/468
[58] Field of Search .................... 119/770, 771, 119/857; 297/468, 469

[56] References Cited

U.S. PATENT DOCUMENTS

| | | | |
|---|---|---|---|
| 1,369,456 | 2/1921 | Meredith | 119/770 |
| 1,551,932 | 9/1925 | Carver . | |
| 2,429,283 | 10/1947 | Veyt | 227/49 |
| 2,817,393 | 12/1957 | Mitchell | 155/189 |
| 2,877,833 | 3/1959 | Boles | 155/189 |
| 2,888,063 | 5/1959 | Rose | 155/189 |
| 3,295,501 | 1/1967 | Riley . | |
| 3,321,247 | 5/1967 | Dillender | 297/389 |
| 4,618,186 | 10/1986 | Swanson | 297/468 |
| 4,758,048 | 7/1988 | Shuman | 297/468 |
| 4,759,311 | 7/1988 | Boyle | 119/857 |
| 4,788,941 | 12/1988 | Villeneuve | 119/857 |
| 4,834,459 | 5/1989 | Leach | 297/467 |
| 4,840,144 | 6/1989 | Voorhees et al. | 119/770 |
| 4,927,211 | 5/1990 | Bolcerek | 297/465 |
| 5,063,879 | 11/1991 | Vorbau | 119/857 |
| 5,080,441 | 1/1992 | Stevenson et al. | 297/488 |
| 5,118,163 | 6/1992 | Brittian et al. | 297/250 |
| 5,125,718 | 6/1992 | Czernakowski et al. | 297/484 |
| 5,143,420 | 9/1992 | Switlik | 297/250 |
| 5,149,172 | 9/1992 | Davis | 297/250 |
| 5,158,337 | 10/1992 | Leggett | 297/250 |
| 5,161,258 | 11/1992 | Coltrain | 2/102 |
| 5,183,007 | 2/1993 | Vincent | 119/770 |
| 5,186,520 | 2/1993 | Whitaker et al. | 297/468 |
| 5,224,229 | 7/1993 | Smith | 5/655 |
| 5,232,263 | 8/1993 | D'Ull et al. . | |
| 5,259,338 | 11/1993 | Cornell | 119/770 |
| 5,265,828 | 11/1993 | Bennington | 244/122 |
| 5,275,178 | 1/1994 | Roberson et al. | 128/875 |
| 5,292,176 | 3/1994 | Artz | 297/250 |
| 5,299,855 | 4/1994 | Zubeck | 297/485 |
| 5,301,371 | 4/1994 | Chao | 2/102 |
| 5,379,725 | 1/1995 | Roberson et al. | 119/770 |
| 5,380,067 | 1/1995 | Turvill et al. | 297/484 |
| 5,385,384 | 1/1995 | Gierman et al. | 297/238 |
| 5,388,551 | 2/1995 | Martusciello | 119/770 |
| 5,390,952 | 2/1995 | Goor | 280/730 |
| 5,423,292 | 6/1995 | Hall | 119/770 |
| 5,435,272 | 7/1995 | Epstein | 119/770 |
| 5,449,216 | 9/1995 | Gierman et al. | 297/216.11 |
| 5,540,403 | 7/1996 | Standley | 244/122 B |
| 5,551,379 | 9/1996 | Hart | 119/771 |

OTHER PUBLICATIONS

U.K. Patent Office Search Report dated Apr. 18, 1997.
Abstract of U.S. Patent No. 3,938,859, filed May 20, 1974, Inventor: Henderson, et al.
Abstract of U.S. Patent No. 3,945,678, filed Sep. 27, 1974, Inventor: Neuman.
Abstract of U.S. Patent No. 3,992,040, filed Jun. 30, 1975, Inventor: Gannac.
Abstract of U.S. Patent No. 4,040,664, filed Nov. 9, 1976, Inventor: Tanaka et al.

(List continued on next page.)

*Primary Examiner*—Robert P. Swiatek
*Assistant Examiner*—Elizabeth Shaw
*Attorney, Agent, or Firm*—Anthony R. Lambert

[57] ABSTRACT

A child safety harness comprising a first seat belt having hooks for securing the seat belt to anchor points of an aircraft or land vehicle, and a second seat belt connected to the first seat belt for fastening around a child. The second seat belt may be fastened to the first seat belt using one or more straps, for example two straps at opposite sides of the child's seat belt. Adjustment slides may be used to alter the length of the adult seat belt and the straps interconnecting the seat belts. A method of securing a child in a vehicle includes fastening a first seat belt around an adult, the seat belt being secured to the vehicle; and fastening a second seat belt around the infant, the second seat belt being secured to the first seat belt.

15 Claims, 4 Drawing Sheets

OTHER PUBLICATIONS

Abstract of U.S. Patent No. 4,215,900, filed Feb. 10, 1978, Inventor: Coult.

Abstract of U.S. Patent No. 4,537,154, filed August 8, 1983, Inventor: Kay.

Abstract of U.S. Patent No. 4,653,809, filed Mar. 12, 1985, Inventor: Czernakowski et al.

Abstract of U.S. Patent No. 4,666,017, filed Sep. 8, 1986, Inventor: Zimmerman.

Abstract of U.S. Patent No. 4,667,624, filed Apr. 17, 1986, Inventor: Smith.

Abstract of U.S. Patent No. 4,738,413, filed May 22, 1985, Inventor: Spinosa, et al.

Abstract of U.S. Patent No. 4,787,677, filed Jun. 8, 1987, Inventor: Reighter.

Abstract of U.S. Patent No. 4,834,460, filed Sep. 21, 1987, Inventor: Herwig.

Abstract of U.S. Patent No. 4,867,464, filed Jan. 26, 1989, Inventor: Cook.

Abstract of U.S. Patent No. 5,002,338, filed Jan. 31, 1990, Inventor: Gisser.

Abstract of U.S. Paten No. 5,031,960, filed Oct. 30, 1989, Inventor: Day.

Abstract of U.S. Patent No. 5,054853, filed Sept. 15, 1989, Inventor: Gillies et al.

Abstract of U.S. Patent No. 5,069168, filed Dec. 13, 1990, Inventor: Roberson et al.

Abstract of U.S. Patent No. 5,074588, filed Nov. 2, 1990, Inventor: Huspen.

Abstract of U.S. Patent No. 5,218,203, issued Jun. 15, 1993, Inventor: Switlik.

Abstract of PCT Application No. PCT/AU94/00251, filed May 16, 1994, Inventor: Tefaye et al.

Abstract of PCT Application No. PCT/US94/12344, filed Nov. 3, 1994, Inventor: Bowman.

CHILD SAFETY HARNESS

FIELD OF THE INVENTION

This invention relates to safety harnesses, particularly as used in aircraft.

BACKGROUND AND SUMMARY OF THE INVENTION

Passive restraint mechanisms for passengers on private and commercial aircraft presently widely in use are intended for use by adults and older children. The seat belts used form a wide loop that is unsuitable for use by younger children, for example aged four months to two years, and even for children aged two years to eight years.

The absence of suitable passive restraint mechanisms for small children poses a safety hazard during hazardous conditions such as severe turbulence, sudden stops during taxiing, and crashes. Carriage of small children in the arms of their parents is an inadequate solution since the forces created by the child during an emergency can far exceed the strength of the parent.

The present invention is intended to provide a simple passive restraint mechanism for small children carried on an aircraft, or in any other moving vehicle, that is intended to protect them against hazardous conditions such as severe turbulence, sudden stops during taxiing, and crashes, yet leave an accompanying adult with their hands free.

The invention in one aspect provides a child safety harness comprising a first seat belt having hooks for securing the seat belt to anchor points of an aircraft or land vehicle, and a second seat belt connected to the first seat belt for fastening around a child.

The second seat belt may be fastened to the first seat belt using one or more straps, preferably two straps at opposite sides of the child's seat belt. Adjustment slides may be used to alter the length of the adult seat belt and the straps interconnecting the seat belts.

In another aspect of the invention, there is provided a method of securing a child in a vehicle comprising the steps of:

fastening a first seat belt around an adult, the seat belt being secured to the vehicle; and fastening a second seat belt around the infant, the second seat belt being secured to the first seat belt.

In a further aspect of the invention, a child seat belt forming a loop is interconnected on opposed sides by two belts to hooks for attachment to the anchor points of a vehicle. According to this aspect of the invention, the child seat belt may operate independently of an adult's seat belt. The belts on either side of the child seat belt may be pulled tight, pulling the child into the seat, while leaving a complete loop around the child.

These and other aspects of the invention appear in the description and claims that follow.

BRIEF DESCRIPTION OF THE DRAWINGS

There will now be described preferred embodiments of the invention, with reference to the drawings, by way of illustration, in which like numerals denote like elements and in which.

DETAILED DESCRIPTION OF PREFERRED EMBODIMENTS

Figure 1:
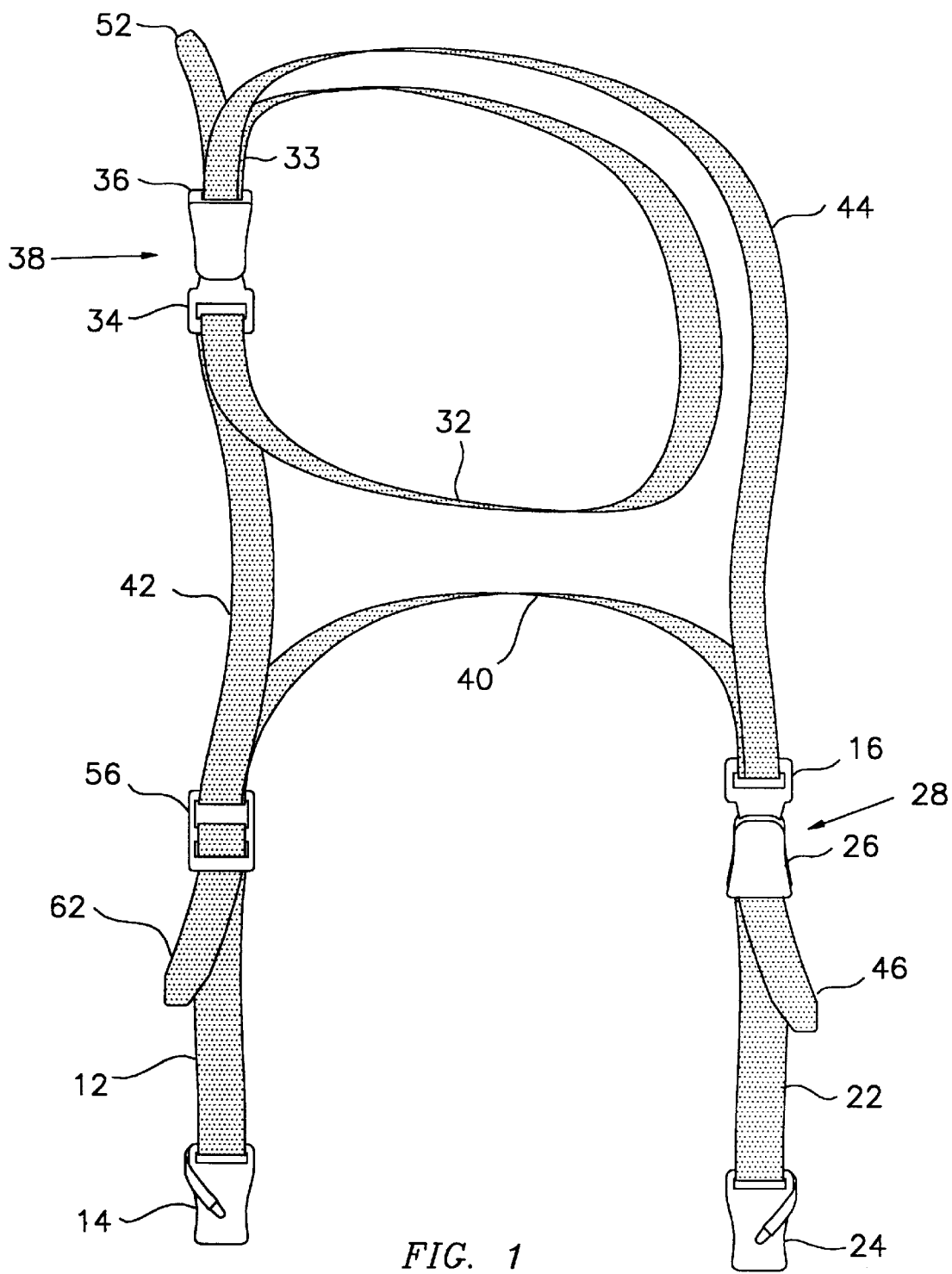
FIG. 1 is a drawing of a first embodiment of the invention showing the seat belts in closed position.
Figure 2:
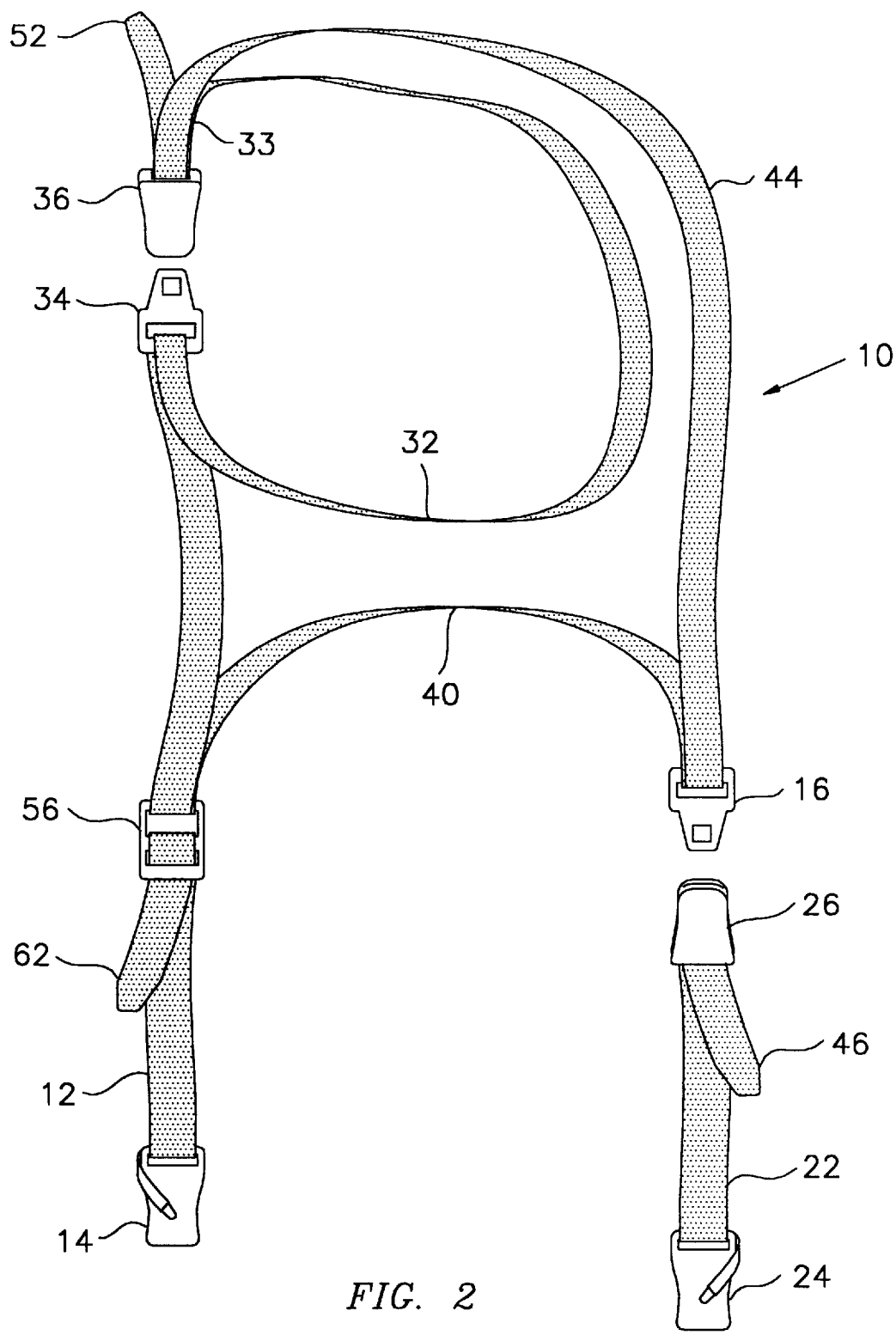
FIG. 2 is a drawing of the first embodiment invention showing the seat belts in open position.

In this patent document, and in the claims, the terms "belt" or "strap" are used to refer to an elongate, flexible, web of material that may be made of one or more interconnected segments. The term "belt segment" is used to refer to a continuous section of the web material.

Referring to the figures, a child safety harness generally designated 10 includes a first belt 12, 40 having a conventional FAA approved hook 14 at one end for connecting to an anchor point (not shown) of an aircraft or other vehicle and a male member 16 of a conventional FAA approved seat belt buckle at the other end. The belt 12, 40 is preferably made from individual belt segments 12 and 40 joined together at adjustment slide 56. The belt segments 12 and 40 may be made of one piece of webbing. The adjustment slide 56 has an adjustable side 64, through which passes the end 62 of belt 12, and a fixed side 66 through which passes one end of the belt 40. Pulling on end 62 tightens the seat belt in conventional fashion.

The safety harness also includes a second belt 22 having a conventional FAA approved hook 24 at one end for connecting to an anchor point (not shown) of an aircraft or other vehicle and a female member 26 of a conventional FAA approved seat belt buckle at the other end. Belt 22 is preferably a single segment. The male member 16 of belt 12, 40 and the female member 26 mate to form a buckle 28 as shown in FIG. 1, and when the seat belt so formed is fastened about an adult, the seat belt works in exactly the same fashion as a conventional adult lap seat belt that is commonly found in land vehicles and airplanes.

A child is restrained by a third belt 32, which forms a loop connected to the seat belt formed by the first and second belts 12 and 22. The two ends of the third belt 32 terminate respectively in male member 34 and female member 36 of a buckle 38 shown fastened in FIG. 1.

The third belt 32 may be connected to the first and second belts in several ways. For example, a single strap or belt 42 may be secured, as for example by sewing, to the third belt and one of the first belt 12 and second belt 22, here shown as the first belt 12. However, this is not preferred. It is preferred to use a single belt segment as strap 42 and belt segment 40, running through the slide adjustment 56, with the slide adjustment fixed in position on the belt 42, 40. In addition, it is preferred to secure the third belt 32 to one of the first belt 12 and the second belt 22, for example the first belt 12 as shown in the drawings, by a strap or belt 44. The strap 44 is secured to the belt 32 at 33 nearer to the female member 36 of buckle 38 than to the male member 34, as for example by sewing, and to the belt segment 40 near the male member 16 of buckle 28. Straps 42 and 44 and belt segment 40 may each be pieces of the same continuous piece of webbing. The straps 42 and 44 are preferably spaced so that they are secured to opposed sides of the loop formed by belt 32, and attached to the first belt 12 so that the belt 32 is more or less symmetrically located on the seat belt formed by the belts 12, 40 and 22. That is, when the third belt 32 is fastened about a child and the first belt 12 and second belt 22 are secured about an adult, the child should preferably be held directly in front of the adult.

The length of the belt 22 may be adjusted in conventional fashion by pulling the free end 46 of the belt 22 through the buckle 28, or the free end 62 of belt 12 through adjustment slide 56. Likewise the length of the belt 32 may be adjusted in conventional fashion by pulling the free end 52 through the buckle 38.

Figure 3:
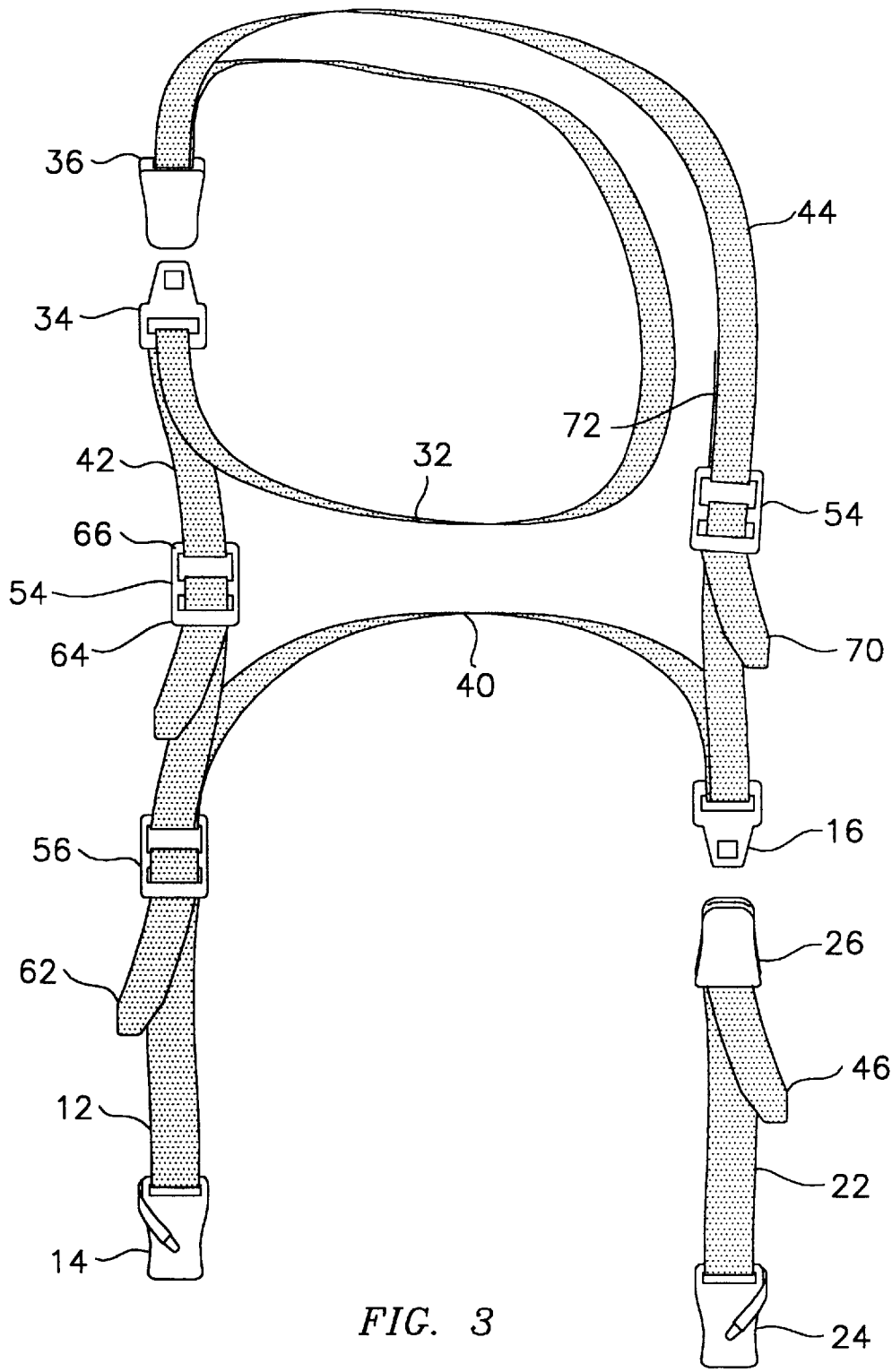
FIG. 3 is a drawing of a second embodiment of the invention.
Figure 4:
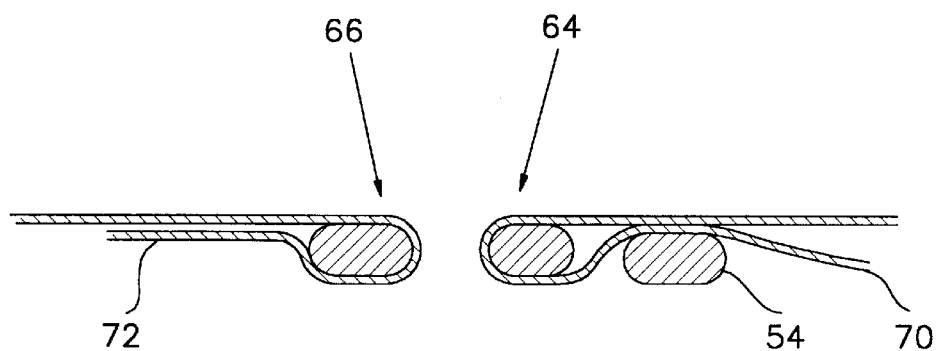
FIG. 4 is a cross-section through an adjustment slide for use in the invention.

Each strap 42 and 44 may also include a conventional FAA approved length adjusting mechanism or slide 54 as shown in FIGS. 3 and 4. The adjustment slide has a fixed side 66, around which belt segment 72 is fixed, and a sliding side 64 through which belt segment 70 passes. Together, the belt segments 70 and 72 make up belt 44. The slide 56 is made in the same fashion, and the belt segment 42 may also be made of adjustable length by incorporation of an adjustment slide identical to the adjustment slide shown in FIG. 4. The belt segments 40 and 42 are preferably sewn or otherwise fastened together at the adjustment slide.

Figure 5:
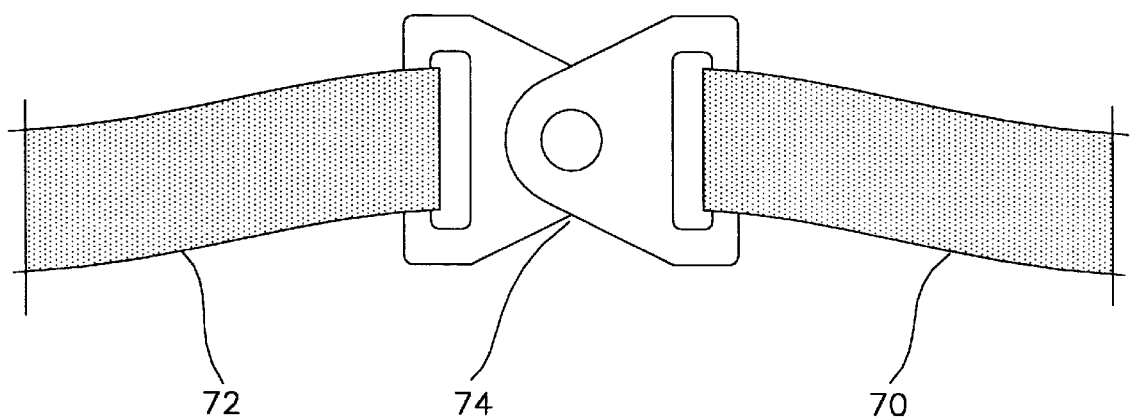
FIG. 5 shows a swivel that might be used in one embodiment of the invention.

The belts 42 and 44 securing the child seat belt 32 to the adult seat belt may also include a swivel 74, illustrated in FIG. 5, in which the belt 44 is shown as being made up of belt segments 70 and 72, similar to the manner shown in FIG. 4. The swivel 74 allows 360° rotation, thus providing greater flexibility for the positioning of the child seat belt. For the swivel 74, a chain may also be used as it serves the same function.

The adjustment slides described here are all conventional FAA approved slides, as for example used for pilot shoulder harnesses or parachute shoulder harnesses.

The seat belt thus described is used to secure an infant in a vehicle by firstly fastening the seat belt formed of segments 12, 22 and 40 around an adult (the seat belt being secured to the vehicle by means of the hooks 14 and 24, and secondly fastening the seat belt 32 around the infant, with the second seat belt being secured to the adult's seat belt.

The child safety harness so described is compact, convenient, easily installed and compatible with modern aircraft furnishings. The belt segment 40 may in addition be omitted to provide a safety harness for a child alone, so that the child seat belt forms a loop interconnected to the hooks by belts 12 and 22 attached to opposed sides of the child seat belt. The belts 12 and 22 may be pulled tight, drawing the child into the seat, and securing the child in the seat. In this embodiment, the belts 12 and 42 form one side belt and the belts 22 and 44 form a second side belt.

The dimensions of the seat belt are chosen to fit an average adult and small child. A portion of wider webbing may be used for the child seat belt for additional protection and support.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. A child safety harness for use in an aircraft or other vehicle having anchor points for a seat belt, the child safety harness comprising:
   a first belt having first and second ends, the first end terminating in a first connector for connection to an anchor point and the second end terminating in a male member of a first buckle;
   a second belt having third and fourth ends, the third end terminating in a second connector for connection to an anchor point and the fourth end terminating in a female member of the first buckle;
   the first and second belts together forming a seat belt for securing an adult;
   a third belt suitable for securing a child, the third belt having fifth and sixth ends, the fifth end terminating in a male member of a second buckle and the sixth end terminating in a female member of the second buckle; and
   interconnecting means securing the third belt to the adult seat belt.

2. The child safety harness of claim 1 in which the interconnecting means includes first and second straps spaced from each other and attached to the third belt on opposing sides of the third belt.

3. The child safety harness of claim 2 in which each strap includes a length adjusting mechanism.

4. The child safety harness of claim 2 in which the first and second straps are both secured to the same one of the first and second belts.

5. The child safety harness of claim 1 in which the first belt includes a length adjusting mechanism.

6. The child safety harness of claim 5 in which the interconnecting means is connected to the first belt at the length adjusting mechanism.

7. The child safety harness of claim 1 in which the interconnecting means includes a swivel.

8. A child safety harness, comprising:
   a first belt having first and second ends, the first end terminating in a first hook;
   an adjustment slide having a fixed side and an adjustable side, the second end of the first belt terminating in the adjustable side of the adjustment slide;
   a second belt having third and fourth ends, the third end terminating in a second hook and the fourth end terminating in a female member of the first buckle;
   a third belt having fifth and sixth ends, the fifth end terminating in a male member of a second buckle and the sixth end terminating in a female member of the second buckle;
   a fourth belt having seventh and eighth ends, the seventh end terminating in the fixed side of the adjustment slide and the eighth end terminating in a male member of the first buckle; and
   interconnecting means securing the third belt to one of the first and second belts.

9. The child safety harness of claim 8 in which the interconnecting means includes first and second straps spaced from each other and attached to the third belt on opposing sides of the third belt.

10. The child safety harness of claim 9 in which each strap includes a length adjusting mechanism.

11. The child safety harness of claim 8 in which the interconnecting means includes a swivel.

12. A child safety harness for use in an aircraft, the child safety harness comprising:
   a first seat belt forming a loop and having a buckle for opening and closing the loop, the loop having first and second sides;
   the buckle being an approved FAA seat belt buckle;
   first and second hooks for connection to a vehicle anchor point;
   a first side belt interconnecting the first side of the loop and the first hook;
   a second side belt interconnecting the second side of the loop and the second hook; and
   the first and second side belts each terminating at the loop.

13. The child safety harness of claim 12 in which the first and second side belts are directly secured to the loop.

14. The child safety harness of claim 13 further including a buckle on the other of the first and second side belts.

15. The child safety harness of claim 12 further including a buckle on one of the first and second side belts.

* * * * *